(12) United States Patent
Ilardo et al.

(10) Patent No.: US 10,113,331 B2
(45) Date of Patent: Oct. 30, 2018

(54) VEHICLE PANEL HANDLE FOR OPENING A PANEL OF AN AUTOMOTIVE VEHICLE

(71) Applicant: VALEO S.p.A., Santena (IT)

(72) Inventors: Simone Ilardo, Pianezza (IT); Vittorio Giaccone, Pianezza (IT)

(73) Assignee: VALEO S.P.A., Santena (IT)

( * ) Notice: Subject to any disclaimer, the term of this patent is extended or adjusted under 35 U.S.C. 154(b) by 813 days.

(21) Appl. No.: 14/763,634

(22) PCT Filed: Aug. 30, 2013

(86) PCT No.: PCT/EP2013/068009
§ 371 (c)(1),
(2) Date: Jul. 27, 2015

(87) PCT Pub. No.: WO2014/033267
PCT Pub. Date: Mar. 6, 2014

(65) Prior Publication Data
US 2016/0069104 A1 Mar. 10, 2016

(30) Foreign Application Priority Data

Aug. 30, 2012 (EP) ..................................... 12425144

(51) Int. Cl.
*E05B 1/00* (2006.01)
*E05B 77/06* (2014.01)
(Continued)

(52) U.S. Cl.
CPC .............. *E05B 1/003* (2013.01); *B60J 5/0493* (2013.01); *E05B 77/06* (2013.01); *E05B 77/02* (2013.01); *E05B 85/10* (2013.01); *Y10S 292/22* (2013.01)

(58) Field of Classification Search
CPC .......... E05B 77/02; E05B 77/04; E05B 77/06; E05B 85/10; Y10S 292/22
See application file for complete search history.

(56) References Cited

U.S. PATENT DOCUMENTS

| 3,799,596 A * | 3/1974 | Nozomu | ............... E05L 377/06 |
| | | | 180/286 |
| 6,042,159 A | 3/2000 | Spitzley et al. | |

(Continued)

FOREIGN PATENT DOCUMENTS

| EP | 0 795 667 A2 | 9/1997 | |
| EP | 1586726 A1 * | 10/2005 | ............. E05B 77/02 |

(Continued)

OTHER PUBLICATIONS

International Search Report issued in corresponding PCT Application No. PCT/EP2013/068009 dated Jan. 8, 2014 (3 pages).

(Continued)

*Primary Examiner* — Carlos Lugo
(74) *Attorney, Agent, or Firm* — Burris Law, PLLC

(57) ABSTRACT

A vehicle panel handle for opening a panel of an automotive vehicle is disclosed. The panel handle includes a handle lever configured to rotate around a first rotation axis between a resting position wherein the panel is closed and an opening position wherein the panel is open, a latch lever configured to rotate around a second rotation axis and to cooperate with the handle lever for opening the panel when the handle lever around the first rotation axis for reaching the opening position, and a counter weight configured for preventing the unwilling rotation of the handle lever. The counter weight has an elongated shape and is configured to rotate around a third rotation axis between an unblocking position in which the latch lever is not prevented from rotating, and a blocking position where the latch lever is preventing from rotating.

5 Claims, 1 Drawing Sheet

Figure 1:
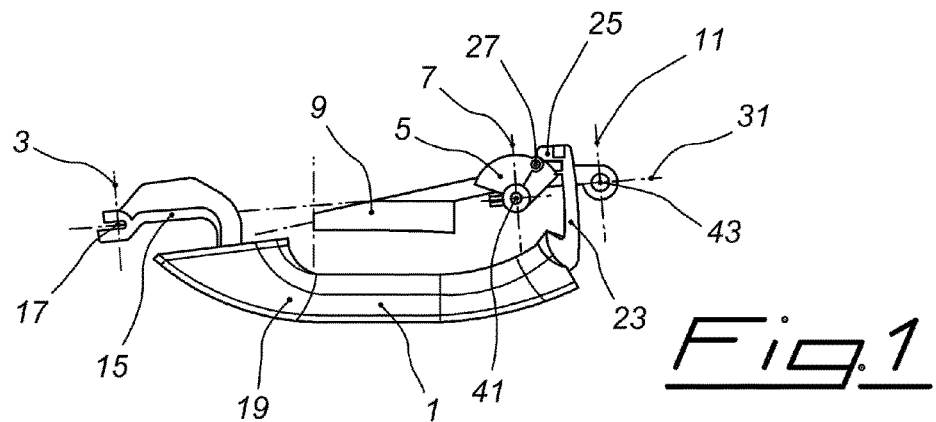

(51) Int. Cl.
*B60J 5/04* (2006.01)
*E05B 77/02* (2014.01)
*E05B 85/10* (2014.01)

(56) References Cited

U.S. PATENT DOCUMENTS

| | | | | |
|---|---|---|---|---|
| 7,070,216 | B2 * | 7/2006 | von zur Muehlen | .................. E05L 377/06 292/336.3 |
| 7,407,203 | B2 * | 8/2008 | Huizenga | .............. E05L 377/06 292/347 |
| 8,857,866 | B2 * | 10/2014 | Savant | .................. E05L 377/06 292/336.3 |
| 2014/0312630 | A1 * | 10/2014 | Bendel | .................. E05L 377/06 292/195 |

FOREIGN PATENT DOCUMENTS

| | | | |
|---|---|---|---|
| EP | 1 593 802 A1 | 11/2005 | |
| EP | 1593802 A1 * | 11/2005 | ............. E05B 77/06 |
| EP | 1 635 016 A2 | 3/2006 | |
| WO | 2009/034035 A1 | 3/2009 | |
| WO | WO-2013146918 A1 * | 10/2013 | ............. E05B 77/06 |

OTHER PUBLICATIONS

Written Opinion issued in corresponding PCT Application No. PCT/EP2013/068009 dated Jan. 8, 2014 (5 pages).

* cited by examiner

VEHICLE PANEL HANDLE FOR OPENING A PANEL OF AN AUTOMOTIVE VEHICLE

The invention relates to a vehicle panel handle for opening a panel of an automotive vehicle.

It is known a kind of vehicle panel handle wherein a handle lever is configured to rotate around a first rotation axis between a resting position wherein the panel is closed and an opening position wherein the panel is open. This handle cooperates with a latch lever and rotates this latter around a second rotation axis. The latch lever activates a Bowden cable in order to open the latch of the panel in the opening position.

This type of handle also comprises a counter weight configured for preventing the unwilling rotation of the handle lever during a car accident. Specifically, the counter weight has an elongated shape and is configured to rotate around a third rotation axis between an unblocking position wherein the latch lever is not prevented from rotating and a blocking position wherein the latch lever is prevented from rotating.

The counterweight moves in rotation during low acceleration range in case of a car accident which leads to the blocking of the handle. Therefore, the passengers of the vehicle cannot be ejected outside the vehicle through the doors, specifically the side doors.

However, in case of heavier handle, a heavy and voluminous counterweight has to be used for balancing such handle. The bracket supporting the first, second and third rotation axis rotates enforced by the barrier impact, specifically if the handle is placed on the rear door. It causes a reduction of the counterweight efficiency. In this case the barrier will impact the door in the area near to the handle hinge. In these conditions, the counterweight, due to its inertia, tends to stay in its position and will cause a pushing effect onto the handle that could be the cause of the panel opening.

Therefore, there is a need for providing a vehicle panel handle with a better level of security during a car accident even in case of heavy handle and wherever such handle is placed.

Therefore, according to one aspect, the present invention relates to a vehicle panel handle for opening a panel of an automotive vehicle comprising:
- a handle lever configured to rotate around a first rotation axis between a resting position wherein the panel is closed and an opening position wherein the panel is open,
- a latch lever configured to rotate around a second rotation axis and to cooperate with the handle lever for opening the panel when the handle lever rotates around the first rotation axis for reaching the opening position,
- a counter weight configured for preventing the unwilling rotation of the handle lever, the counter weight having an elongated shape and configured to rotate around a third rotation axis between an unblocking position wherein the latch lever is not prevented from rotating and a blocking position wherein the latch lever is preventing from rotating, wherein the second rotation axis is disposed between the first rotation axis and the third rotation axis.

Thanks to the disposition of the first, second and third rotation axes in the handle, the vehicle panel handle of the invention avoids any opening of the panel by preventing the rotation of the handle lever in case of low acceleration during a car accident.

Therefore, the panel handle of the present invention with a simple configuration improves the security of the user placed inside the vehicle.

Furthermore, the panel handle of the present invention may be employed to handle with different type of design, in particular to any handle with different shape and also to heavy handle.

In a simple and not costly way, the handle of the present invention enables improving the security in case of car accident without amending the exterior aspect of the handle and of the panel.

The present invention may also comprise the following features taken alone or according to any combination:
- the first, second and third rotation axes are disposed sensibly parallel to each other which enables a wide range of handle design;
- the counter weight rotates around the third rotation axis until a part of said counter weight comes into abutment against a part of the latch lever in the blocking position which enables an efficient blocking of the handle in case of car accident;
- the counter weight comprises an arm intended to cooperate with a recess or a protrusion of the latch lever which is a simple configuration;
- the second axis is closer from the third axis than from the first axis which enables a wide range of counterweight design;
- the third axis is placed away from the area underneath the handle lever which also enables a wide range of counterweight design;
- the handle comprises a support configured to receive the first, second and third axes.

Figure 2:
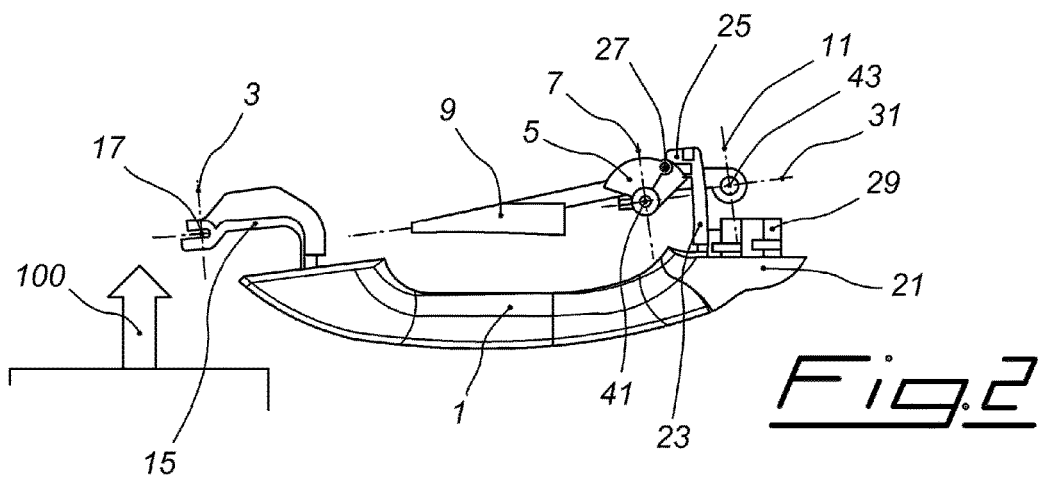
Figure 3:
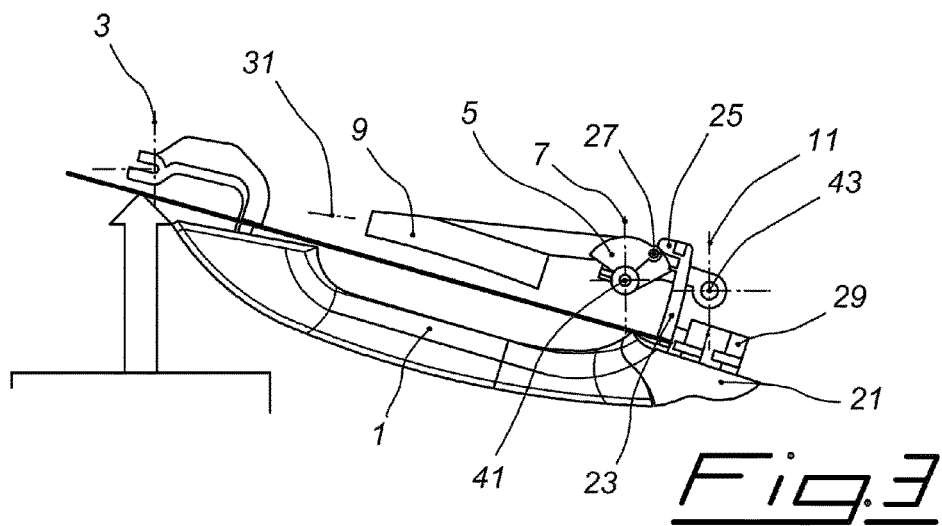

The present invention will be better understood at the light of the following description given as example and illustrated by the following drawings:

FIG. 1 is a partial perspective side view of one embodiment of a handle lever, latch lever and counterweight of an handle of the invention, FIG. 2 is a partial perspective side view of the embodiment of FIG. 1 before an impact, FIG. 3 is a partial perspective side view of the embodiment of FIG. 1 after the impact.

On all figures, the same references relate to the same elements.

According to the invention, the vehicle panel handle enables the opening of a panel of an automotive vehicle.

Such panel may be a door, such as a side door, or even a trunk.

As illustrated in all figures, the handle of the invention comprises:
- a handle lever 1 configured to rotate around a first rotation axis 3 between a resting position wherein the panel (not shown) is closed and an opening position wherein the panel is open,
- a latch lever 5 configured to rotate around a second rotation axis 7 and to cooperate with the handle lever 1 for opening the panel when the handle lever 1 rotates around the first rotation axis 3 for reaching the opening position,
- a counterweight 9 configured for preventing the unwilling rotation of the handle lever 1, the counterweight 9 having an elongated shape and configured to rotate around a third rotation axis 11 between an unblocking position wherein the latch lever 5 is not prevented from rotating and a blocking position wherein the latch lever 5 is prevented from rotating, the second rotation axis 9 is disposed between the first rotation axis 7 and the third rotation axis 11.

The disposition of the first, second and third rotation axis in the handle enables a high efficiency for preventing the opening of the handle if the handle undergoes an impact. Indeed, the said configuration guaranties that the counterweight will follow the deformation of the handle structure due to the impact (see FIG. 3) but the said counterweight will not move relatively to the handle lever and the latch lever. During the impact, the handle lever will rotate and try to move the latch lever.

Since all of the structure of the handle is deformed by the impact, the counterweight will block the rotation of the latch lever.

Contrary to the known same kind of handle, the counterweight will stay fixe and not undergo forces making it push onto the latch lever and be responsible of the opening of the panel. The rotation of the latch lever due to the motion of the counterweight after the impact is therefore avoided.

Furthermore, the panel handle of the present invention may be employed to handle with different kind of shape and specifically to heavy handle.

In a simple and not costly way, the handle of the present invention enables improving the security in case of car accident without amending the exterior aspect of the handle and of the panel.

The handle also may comprise a support also called "bracket", not shown, on which the handle lever 1, the latch lever 5 and the counterweight 9 are mounted. The support may be fixed in the panel. Advantageously, the support may be able to receive the first 3, second 7 and third 11 axes.

The handle lever 1 rotates around the first axis 3. For this purpose, the handle lever 1 may have a part, here localized sensibly at an end 15, forming an opening, a hole 17 or a recess. The said hole or recess may have a shape sensibly of a U or V. A pin (not shown), for example fixed or belonging to the support or to the panel, may go through the opening, the hole 17 or the recess of the handle lever authorizing the rotation of the said handle lever 1 around the first axis 3. The first rotation axis movement is transmitted to the rest of the handle lever 1 by a piece with a sensibly curved shape for enabling the handle lever 1 to move outside the panel. Indeed, for esthetic reason, the handle lever may be placed so that only a part 19 intended to be gripped by the user is visible from the outside of the automotive vehicle.

The handle lever 1 may also comprise means for cooperating with the latch lever 5. The said means may be for example a extension 23 configured for making the latch lever 1 rotate. In this perspective, the extension 23 may have a recess or a protrusion 25 capable of cooperating with respectively a protrusion or a recess 27 made in a part of the latch lever 1.

The said latch lever 5 is connected to a Bowden cable (not shown) linked to the latch (not shown). Once the latch lever 5 rotates around the second axis 7, the Bowden cable activates the latch and then the panel is open.

For providing the rotation movement, the latch lever 5 may have an opening 41 made through the body of the latch lever intended to receive a pin (not shown) mounted on the support or on the panel.

The support may also comprise a fixed part 21 (see FIGS. 2 and 3) enabling a part of the handle lever 1 to be inserted through or fixed on the said fixed part 21. The said fixed part 21 may be configured for receiving a control element such as a lock 29 intended to receive a key (see FIGS. 2 and 3). For this purpose the said fixed part 21 may delimit a recess (not visible) for receiving the said lock 29.

The said fixed part 21 is fixed relative to the mobile handle lever 1 capable of rotating around the first axis 3.

According to the present embodiment, the latch lever 5 is put between the around first axis 3 and the extension 23 of the handle lever.

The counterweight 9 is configured for preventing the unwilling rotation of the handle lever 1, specifically at low acceleration during a car accident. The counter weight 1 has an elongated shape around a longitudinal axis 31. The said counterweight 9 may have a sensibly parallelepiped shape with a length sensibly higher than the thickness according to the longitudinal axis 31.

The said counterweight 9 is movable in rotation around a third rotation axis 11. In this purpose, the said counterweight may have a part forming with an opening 43 through which a pin fixed or belonging to the support may pass. Said opening 43 may be made at an end of the counterweight.

The second axis 7 may be closer from the third axis 11 than from the first axis 3 which enables a wide range of counterweight design.

Advantageously, the counterweight 9 may rotate around the third rotation axis 11 until a part (not shown) of said counterweight comes into abutment in the blocking position against a part of the latch lever 5 which enable an efficient blocking of the handle in case of car accident.

The said part may be an arm (not shown) intended to cooperate with a recess or a protrusion (not shown) of the latch lever 5 which is a simple configuration.

In the unblocking position corresponding to the normal use, the counterweight is placed away from the latch lever so that the user can normally pull the handle lever which will make the latch lever rotate and then activate the latch for opening the panel.

The first 3, second 7 and third 11 rotation axes may be disposed sensibly parallel to each other which enables a wide range of handle design.

The said axes may be placed quite closed to the support of the handle.

In the normal use, the counterweight 9 is in the unblocking position which means that the said counterweight 9 is placed away from the latch lever 5 so that the user can normally pull the handle lever 1 which will make the latch lever 5 rotate around the second axis 7 and then activate the latch for opening the panel (see FIG. 1).

In case of an impact at low acceleration of the handle, a force 100 is applied to the panel. The panel and also the support of the handle is deformed leading to the rotation of the handle lever 1 around the first rotation axis 3. The means 23 will therefore tend to rotate the latch lever 5 around the second axis 7. The counterweight 9 stays immobile relative to the handle lever 1 but follows the deformation of the handle structure. Therefore, the said counterweight 9 comes in the blocking position and stops the rotation of the latch lever 5. The panel is then kept close.

The invention claimed is:

1. A vehicle panel handle for opening a panel of an automotive vehicle comprising:
   a handle lever configured to rotate around a first rotation axis between a resting position wherein the panel is closed and an opening position wherein the panel is open, the first rotation axis being perpendicular to a pivotal plane of the handle lever;
   a latch lever configured to rotate around a second rotation axis and to cooperate with the handle lever for opening the panel when the handle lever rotates around the first rotation axis for reaching the opening position, the second rotation axis intersecting the pivotal plane of the handle lever and defines a first vector from the second rotation axis to the first rotation axis;

a counter weight configured for preventing the unwilling rotation of the handle lever, the counter weight is configured to rotate around a third rotation axis between an unblocking position wherein the latch lever is not prevented from rotating, and a blocking position wherein the latch lever is preventing from rotating, the counterweight comprising an elongated body having one end defining the third rotation axis and an opposed end having a weight portion, wherein the weight portion is located between the first rotation axis and the second rotation axis, the third rotation axis intersecting the pivotal plane of the handle lever and defines a second vector from the second rotation axis to the third rotation axis; and an extension of the handle lever disposed between the second rotation axis and the third rotation axis along a longitudinal direction that is substantially orthogonal to the second vector, wherein the extension of the handle lever is configured to cooperate with a recess or protrusion of the latch lever to rotate the latch lever, wherein the second rotation axis is disposed between the first rotation axis and the third rotation axis such that the first vector and the second vector form an obtuse angle.

2. The handle according to claim 1, wherein the first, second and third rotation axes are disposed sensibly parallel to each other.

3. The handle according to claim 1, wherein the counter weight rotates around the third rotation axis until a part of said counter weight comes into abutment against a part of the latch lever in the blocking position.

4. The handle according to claim 1, wherein the second axis is closer from the third axis than from the first axis.

5. The handle according to claim 1, wherein the third axis is placed away from the area underneath the handle lever.

* * * * *